United States Patent
Gabbey et al.

(10) Patent No.: US 12,360,001 B2
(45) Date of Patent: Jul. 15, 2025

(54) PRESSURE TESTING AND REFILLING DEVICES, SYSTEMS, AND METHODS

(71) Applicant: Snap-on Incorporated, Kenosha, WI (US)

(72) Inventors: Nicholas A. Gabbey, Mount Pleasant, WI (US); George R. R. Call, Kenosha, WI (US); William Joseph Tadda, Jr., Salem, WI (US)

(73) Assignee: Snap-on Incorporated, Kenosha, WI (US)

( * ) Notice: Subject to any disclaimer, the term of this patent is extended or adjusted under 35 U.S.C. 154(b) by 74 days.

(21) Appl. No.: 18/227,900

(22) Filed: Jul. 28, 2023

(65) Prior Publication Data

US 2025/0035505 A1    Jan. 30, 2025

(51) Int. Cl.
*G01M 3/26* (2006.01)
*B60S 5/00* (2006.01)
*G01M 3/32* (2006.01)

(52) U.S. Cl.
CPC ............. *G01M 3/26* (2013.01); *B60S 5/00* (2013.01); *G01M 3/3227* (2013.01)

(58) Field of Classification Search
CPC .......... G01M 3/26; G01M 3/3227; B60S 5/00
See application file for complete search history.

(56) References Cited

U.S. PATENT DOCUMENTS

| | | | | |
|---|---|---|---|---|
| 3,583,210 A * | 6/1971 | Orr | ................ | G01M 3/3227 73/49.2 |
| 4,739,730 A * | 4/1988 | Jenz | ................ | F01P 11/029 73/49.3 |
| 5,615,716 A * | 4/1997 | Akazawa | ................ | F01P 11/06 165/95 |
| 6,360,790 B1 * | 3/2002 | Klamm | ................ | F01P 11/0214 141/382 |
| 6,604,557 B2 * | 8/2003 | Awad | ................ | F01P 11/06 141/59 |
| 6,637,468 B1 * | 10/2003 | Wu | ................ | F02B 77/04 141/7 |
| 6,935,163 B2 * | 8/2005 | Stewart | ................ | G01M 3/26 73/49.7 |

(Continued)

FOREIGN PATENT DOCUMENTS

WO    2011/072680    6/2011

OTHER PUBLICATIONS

International Searching Authority, International Search Report and Written Opinion mailed Oct. 21, 2024, issued in connection with International Patent Application No. PCT/US2024/039946, mailed Jul. 26, 2024, 16 pages.

*Primary Examiner* — Nicolas A Arnett
(74) *Attorney, Agent, or Firm* — McDonnell Boehnen Hulbert & Berghoff LLP

(57) ABSTRACT

The present disclosure describes implementations that relate to a pressure testing and refilling a coolant system. In a first embodiment, the present disclosure describes a pressure tester and refilling device that has a valve system and adapters configured to pressurize and pull a vacuum on the system without disconnecting any of the connections. The device includes a plurality of passages that couple to a vehicle coolant inlet, a pressurized air source, an external coolant source, and an exit. Within these passages, the device has several valves that can be controlled.

20 Claims, 9 Drawing Sheets

(56) References Cited

U.S. PATENT DOCUMENTS

| | | | |
|---|---|---|---|
| 7,000,467 B2* | 2/2006 | Chu | G01F 23/18 73/299 |
| 7,346,448 B2* | 3/2008 | Graf | G01M 15/09 701/114 |
| 7,614,283 B2* | 11/2009 | Allen | F01P 11/18 73/49.7 |
| 7,748,262 B2* | 7/2010 | Reginaldo | F01P 11/028 73/116.01 |
| 8,590,580 B2* | 11/2013 | Bedi | F01P 11/0276 141/98 |
| 8,631,662 B2* | 1/2014 | Castle | G01M 3/3227 73/39 |
| 8,813,792 B2* | 8/2014 | Ehlers | F01P 11/0204 141/98 |
| 8,875,561 B2* | 11/2014 | Worden | F01P 11/18 73/40 |
| 8,989,932 B2* | 3/2015 | Shono | H02K 9/19 123/41.27 |
| 9,115,636 B2* | 8/2015 | Allen | F01P 11/0204 |
| 9,151,695 B2* | 10/2015 | Worden | F01P 11/18 |
| 9,394,930 B2* | 7/2016 | Bedi | F01P 11/0204 |
| 10,006,337 B2* | 6/2018 | Strode | G07C 5/0825 |
| 10,473,549 B2* | 11/2019 | Bright | G01M 3/025 |
| 10,497,531 B2* | 12/2019 | Bedi | H01J 9/38 |
| 10,914,228 B2* | 2/2021 | Ernst | F01K 11/02 |
| 10,996,134 B2* | 5/2021 | Duan | F01P 11/18 |
| 11,328,890 B2* | 5/2022 | Bedi | H01J 9/38 |
| 11,441,968 B2* | 9/2022 | Smith | G01M 3/002 |
| 11,578,887 B2* | 2/2023 | Delgoshaei | F24F 11/86 |
| 11,885,572 B2* | 1/2024 | Sheehan | A23B 2/003 |
| 12,061,133 B2* | 8/2024 | Livesay | G01M 3/26 |
| 2003/0102049 A1* | 6/2003 | Awad | F01P 11/06 141/65 |
| 2009/0301174 A1* | 12/2009 | Wen | G01M 3/3227 73/49.7 |
| 2010/0200109 A1* | 8/2010 | Liao | B60H 1/00585 141/94 |
| 2010/0319902 A1* | 12/2010 | Chou | G05D 16/202 165/281 |
| 2012/0318404 A1* | 12/2012 | Ehlers | F01P 11/0276 141/8 |
| 2013/0213523 A1* | 8/2013 | Allen | F01P 11/0204 137/861 |
| 2013/0295478 A1* | 11/2013 | Han | H01M 8/04417 429/428 |
| 2014/0038072 A1* | 2/2014 | Han | B60L 58/34 429/428 |
| 2017/0313157 A1* | 11/2017 | Dao | F01P 11/0204 |
| 2020/0105491 A1* | 4/2020 | Bedi | H01J 9/38 |

* cited by examiner

PRESSURE TESTING AND REFILLING DEVICES, SYSTEMS, AND METHODS

BACKGROUND

Devices that pressure test and refill a vehicle thermal management system with a fluid (e.g., coolant) typically require several components that must be attached and detached throughout the process of testing the pressure and refilling the system. For example, after replacing a component of or repairing a leak in a coolant system, a user can attach a hand pump or other pressurizing device to pressurize the coolant system while visually gauging the pressure. The user then removes the pressure testing device and attaches a separate device to create a vacuum in the system until a certain vacuum level is reached in order to remove unwanted air from the system and draw coolant from an external source into the coolant system. This process typically requires several cycles and constant monitoring by the user. During these cycles, a user may have to disconnect and reconnect the pressure testing system and the vacuum system. As a result, pressurizing and refilling a coolant system using typical methods can be time consuming and inefficient. Other devices use a coolant flushing machine that can fill the system and pressurize the system. However, these devices do not allow for leak-testing the system while filling and pressurizing.

SUMMARY

The present disclosure describes implementations that relate to a pressure testing and refilling a vehicle's thermal management system. The thermal management system is also commonly referred to as a coolant system or cooling system. The thermal management system in a vehicle commonly removes heat from components connected to the system using a liquid and is commonly used for engines and transmissions, but in certain applications the system will also maintain a vehicle's component at a desired temperature by removing heat from the component and also adding heat into the component using heating elements in the thermal management system to heat the fluid. For example, electric vehicle's high voltage batteries and electric motors use coolant systems to increase or decrease the temperature of the battery to maintain the optimal temperature range for charging and discharging of the high voltage system. In some embodiments, a pressure tester and refilling device has a valve system and adapters that are configured to pressurize and pull a vacuum on the system without disconnecting any of the connections. In such embodiments, the device has passages that couple to a vehicle's coolant inlet, a pressurized air source, an external coolant source, and a Venturi exit. Within these passages, the device has several valves that can be controlled by an on-board processing unit and electronics.

In a first aspect, the present disclosure describes a pressure testing apparatus for refilling a coolant system with coolant and testing the pressure of the coolant system. The pressure testing apparatus has a plurality of passages including, an inlet passage coupled to the coolant system, a pressurized gas passage coupled to a pressurized gas source, a coolant source passage coupled to an external coolant container, and an exit passage. The pressure testing system also has a plurality of operating valves, each operating valve being disposed in a respective passage of the plurality of passages. The pressure testing system further includes a pressure sensor disposed in a downstream section of the pressurized gas passage, the downstream section being disposed between at least two operating valves of the plurality of operating valves and the coolant system. The pressure testing system additionally includes a controller configured to send a first shut-off control signal to each operating valve, closing the operating valves. The controller then sends a first turn-on control signal to the operating valve disposed in the pressurized gas passage, opening the valve disposed in the pressurized gas passage. In response to receiving an indication that a first measured pressure in the downstream section of the pressurized gas passage is a first predetermined pressure value, the controller sends a second shut-off control signal to the operating valve disposed in the pressurized gas passage thereby triggering the closing of the operating valve disposed in the pressurized gas passage. In response to receiving an indication that a second measured pressure does not decrease to a second predetermined pressure value in a first predetermined duration of time after sending the second shut-off control signal to the operating valve disposed in the pressurized gas passage, the controller sends second turn-on control signals to the operating valve disposed between the pressurized gas source and the exit passage and the operating valve disposed between the coolant source passage and the exit passage, the second turn-on control signals opening the respective operating valves thereby creating a second measured pressure value in the pressure testing system. In response to receiving an indication that the second measured pressure decreases to a third predetermined pressure value, the controller sends a third shut-off control signal to the operating valve disposed between the coolant system and the exit passage, the third shut-off control signal closing the operating valve disposed between the coolant system and the exit passage, and sends a third turn-on control signal to the operating valve disposed between the external coolant container and the coolant system, the third turn-on control signal opening the operating valve. In response to receiving an indication that a fourth measured pressure is a fourth predetermined pressure value, receiving a signal from a level sensor, the level sensor configured to measure a first level of coolant in the coolant system. In response to receiving an indication that the first level of coolant in the coolant system is a predetermined coolant level, the controller sends a fourth shut-off signal to the operating valve disposed between the external coolant container and the coolant system, the fourth shut-off signal closing the operating valve. In response to receiving an indication that a fifth measured pressure does not decrease to a fifth predetermined pressure value in a second predetermined duration of time, the controller sends an indication that the coolant system has been refilled and is free of a substantial leak.

In an embodiment of the apparatus, the controller is further configured to, in response to receiving an indication that the first measured pressure does not increase to the first predetermined pressure value, send an indication of a leak in the pressure testing system.

In another embodiment of the apparatus, the controller is further configured to, in response to receiving an indication that the second measured pressure decreases to the second predetermined pressure value in the first predetermined duration of time, send an indication of a leak in the pressure testing system.

In another embodiment of the apparatus, the controller is further configured to, in response to receiving an indication that the fifth measured pressure decreases to the fifth predetermined pressure value in the second predetermined duration of time, send an indication of a leak in the pressure testing system.

In another embodiment of the apparatus, the controller is further configured to: (1) in response to receiving an indication that the first level of coolant in the coolant system is lower than the predetermined coolant level (i) sending a fourth turn-on signal to the operating valve disposed in the pressurized gas passage, the fourth turn-on signal opening the operating valve (ii) sending a fifth turn-on signal to the operating valve disposed between the coolant system and the exit passage, the fifth turn-on signal opening the operating valve; and (iii) sending a fifth shut-off signal to the operating valve disposed between the external coolant container and the coolant system, the fifth shut-off signal closing the operating valve; (2) in response to receiving an indication that a sixth measured pressure decreases to the third predetermined pressure value, (i) sending a sixth shut-off control signal to the operating valve disposed between the coolant system and the exit passage, the sixth shut-off control signal closing the operating valve disposed between the coolant system and the exit passage, and (ii) sending a sixth turn-on control signal to the operating valve disposed between the external coolant container and the coolant system, the sixth turn-on control signal opening the operating valve; (3) in response to receiving an indication that a seventh measured pressure is the fourth predetermined pressure value, receiving a signal from a level sensor, the level sensor configured to measure a second level of coolant in the coolant system; (4) in response to receiving an indication that the second level of coolant in the coolant system is the predetermined coolant level, sending a seventh shut-off signal to the operating valve disposed between the external coolant container and the coolant system, the seventh shut-off signal closing the operating valve; and (5) in response to receiving an indication that an eighth measured pressure does not decrease to the fifth predetermined pressure value in the second predetermined duration of time, sending an indication that the coolant system has been refilled and is free of a substantial leak.

In another embodiment of the apparatus, the controller is further configured to perform operations (1)-(5) until receiving an indication that a measured level of coolant in the coolant system is the predetermined coolant level.

In another embodiment of the apparatus, the controller is coupled to a user interface system, the user interface system configured to receive an input from a user to control the plurality of operating valves.

In another embodiment of the apparatus, the level sensor is further configured to read a coolant level in the coolant system until receiving an indication that the coolant level in the coolant system is the predetermined coolant level.

In another embodiment of the apparatus, the pressurized gas source stores compressed air.

In another embodiment of the apparatus, the plurality of operating valves are electronically controlled mechanical valves.

In another embodiment of the apparatus, the apparatus includes a passage disposed between the exit passage and the external coolant source.

In another aspect, the disclosure describes a system including a coolant system, a pressurized gas source, an external coolant container, a pressure testing device, and a controller. The pressure testing device including an inlet passage coupled to the coolant system, a coolant source passage coupled to the external coolant container, a pressurized gas passage coupled to the pressurized gas source, an exit passage, a first operating valve disposed between the inlet passage and the exit passage, a second operating valve disposed between the inlet passage and the pressurized gas passage, a third operating valve disposed between the pressurized gas passage and the coolant source passage, a fourth operating valve disposed between the pressurized gas passage and the exit passage, and a pressure transducer disposed in a downstream section of the pressurized gas passage, the downstream section being disposed between at least the second operating valve and the fourth operating valve. The controller is configured to perform operations including sending a first shut-off control signal to each operating valve of the plurality of operating valves, where each first shut-off control signal closes the respective operating valve and sending a first turn-on control signal to the operating valve disposed in the pressurized gas passage, where the first turn-on control signal triggers the opening of the operating valve disposed in the pressurized gas passage. The controller is further configured to, in response to receiving an indication that a first measured pressure in the downstream section of the pressurized gas passage is a first predetermined pressure value, send a second shut-off control signal to the operating valve disposed in the pressurized gas passage thereby triggering the closing of the operating valve disposed in the pressurized gas passage. In response to receiving an indication that a second measured pressure does not decrease to a second predetermined pressure value in a first predetermined duration of time after sending the second shut-off control signal to the operating valve disposed in the pressurized gas passage, the controller sends second turn-on control signals to (i) the operating valve disposed between the pressurized gas source and the exit passage and (ii) the operating valve disposed between the coolant source passage and the exit passage, the second turn-on control signals opening the respective operating valves thereby creating a second measured pressure value in the pressure testing system. In response to receiving an indication that the second measured pressure decreases to a third predetermined pressure value, the controller (i) sends a third shut-off control signal to the operating valve disposed between the coolant system and the exit passage, the third shut-off control signal closing the operating valve disposed between the coolant system and the exit passage, and (ii) sends a third turn-on control signal to the operating valve disposed between the external coolant container and the coolant system, the third turn-on control signal opening the operating valve. In response to receiving an indication that a fourth measured pressure is a fourth predetermined pressure value, the controller receives a signal from a level sensor, the level sensor configured to measure a first level of coolant in the coolant system. In response to receiving an indication that the first level of coolant in the coolant system is a predetermined coolant level, the controller sends a fourth shut-off signal to the operating valve disposed between the external coolant container and the coolant system, the fourth shut-off signal closing the operating valve. In response to receiving an indication that a fifth measured pressure does not decrease to a fifth predetermined pressure value in a second predetermined duration of time, the controller sends an indication that the coolant system has been refilled and is free of a substantial leak.

In an embodiment of the system, the pressure testing apparatus is connected to a vehicle's coolant system.

In an embodiment of the system, the exit passage is coupled to the external coolant source.

In an embodiment of the system, the system includes a user interface system coupled to the controller, where the user interface system is configured to receive an input from a user to send command signals to the operating valves of the pressure testing system.

In another aspect, the disclosure descripts a method for pressure testing a coolant system. The coolant system includes a plurality of passages comprising an inlet passage coupled to a coolant source, a pressurized gas passage coupled to a pressurized gas source, a coolant source passage coupled to an external coolant container, and an exit passage, and a plurality of operating valves, each operating valve being disposed in a respective passage of the plurality of passages. The method includes sending a first shut-off control signal to each operating valve of the plurality of operating vales, where each first shut-off control signal closes the respective operating valve. The method includes sending a first turn-on control signal to the operating valve disposed in the pressurized gas passage, where the first turn-on control signal triggers the opening of the operating valve disposed in the pressurized gas passage. In response to receiving, by a pressure transducer, an indication that a first measured pressure in the downstream section of the pressurized gas passage is a first predetermined pressure value, the controller sends a second shut-off control signal to the operating valve disposed in the pressurized gas passage thereby triggering the closing of the operating valve disposed in the pressurized gas passage. In response to receiving an indication that a second measured pressure does not decrease to a second predetermined pressure value in a first predetermined duration of time after sending the second shut-off control signal to the operating valve disposed in the pressurized gas passage, the controller sends second turn-on control signals to (i) the operating valve disposed between the pressurized gas source and the exit passage and (ii) the operating valve disposed between the coolant source passage and the exit passage, the second turn-on control signals opening the respective operating valves thereby creating a second measured pressure value in the pressure testing system. In response to receiving an indication that the second measured pressure decreases to a third predetermined pressure value, the controller (i) sends a third shut-off control signal to the operating valve disposed between the coolant system and the exit passage, the third shut-off control signal closing the operating valve disposed between the coolant system and the exit passage, and (ii) sends a third turn-on control signal to the operating valve disposed between the external coolant container and the coolant system, the third turn-on control signal opening the operating valve. In response to receiving an indication that a fourth measured pressure is a fourth predetermined pressure value, the controller receives a signal from a level sensor, the level sensor configured to measure a first level of coolant in the coolant system. In response to receiving an indication that the first level of coolant in the coolant system is a predetermined coolant level, the controller sends a fourth shut-off signal to the operating valve disposed between the external coolant container and the coolant system, the fourth shut-off signal closing the operating valve. In response to receiving an indication that a fifth measured pressure does not decrease to a fifth predetermined pressure value in a second predetermined duration of time, the controller sends an indication that the coolant system has been refilled and is free of a substantial leak.

In an embodiment of the method for pressure testing and refilling a coolant system, the method further includes, in response to receiving an indication that the first measured pressure does not increase to the first predetermined pressure value, sending an indication of a leak in the pressure testing system.

In an embodiment of the method for pressure testing and refilling a coolant system, the method further includes, in response to receiving an indication that the second measured pressure decreases to the second predetermined pressure value in the first predetermined duration of time, sending an indication of a leak in the pressure testing system.

In an embodiment of the method for pressure testing and refilling a coolant system, the method further includes, in response to receiving an indication that the fifth measured pressure decreases to the fifth predetermined pressure value in the second predetermined duration of time, sending an indication of a leak in the pressure testing system.

In an embodiment of the method for pressure testing and refilling a coolant system, the method further includes, in response to receiving an indication that the first level of coolant in the coolant system is lower than the predetermined coolant level (i) sending a fourth turn-on signal to the operating valve disposed in the pressurized gas passage, the fourth turn-on signal opening the operating valve (ii) sending a fifth turn-on signal to the operating valve disposed between the coolant system and the exit passage, the fifth turn-on signal opening the operating valve; and (iii) sending a fifth shut-off signal to the operating valve disposed between the external coolant container and the coolant system, the fifth shut-off signal closing the operating valve. The method further includes, in response to receiving an indication that a sixth measured pressure decreases to the third predetermined pressure value, (i) sending a sixth shut-off control signal to the operating valve disposed between the coolant system and the exit passage, the sixth shut-off control signal closing the operating valve disposed between the coolant system and the exit passage, and (ii) sending a sixth turn-on control signal to the operating valve disposed between the external coolant container and the coolant system, the sixth turn-on control signal opening the operating valve. The method further still includes, in response to receiving an indication that a seventh measured pressure is the fourth predetermined pressure value, receiving a signal from a level sensor, the level sensor configured to measure a second level of coolant in the coolant system. The method further includes, in response to receiving an indication that the second level of coolant in the coolant system is the predetermined coolant level, sending a seventh shut-off signal to the operating valve disposed between the external coolant container and the coolant system, the seventh shut-off signal closing the operating valve. The method further includes, in response to receiving an indication that an eighth measured pressure does not decrease to the fifth predetermined pressure value in the second predetermined duration of time, sending an indication that the coolant system has been refilled and is free of a substantial leak.

Other embodiments will become apparent to those of ordinary skill in the art by reading the following detailed description, with reference where appropriate to the accompanying drawings.

BRIEF DESCRIPTION OF THE DRAWINGS

Example embodiments are described herein with reference to the drawings.

DETAILED DESCRIPTION

This description describes several example embodiments, at least some of which pertain to devices, systems, and methods for pressure testing and refilling a coolant system. Beneficially embodiments described herein enable a user to leak test a coolant system while filling and pressurizing the system.

Figure 1:
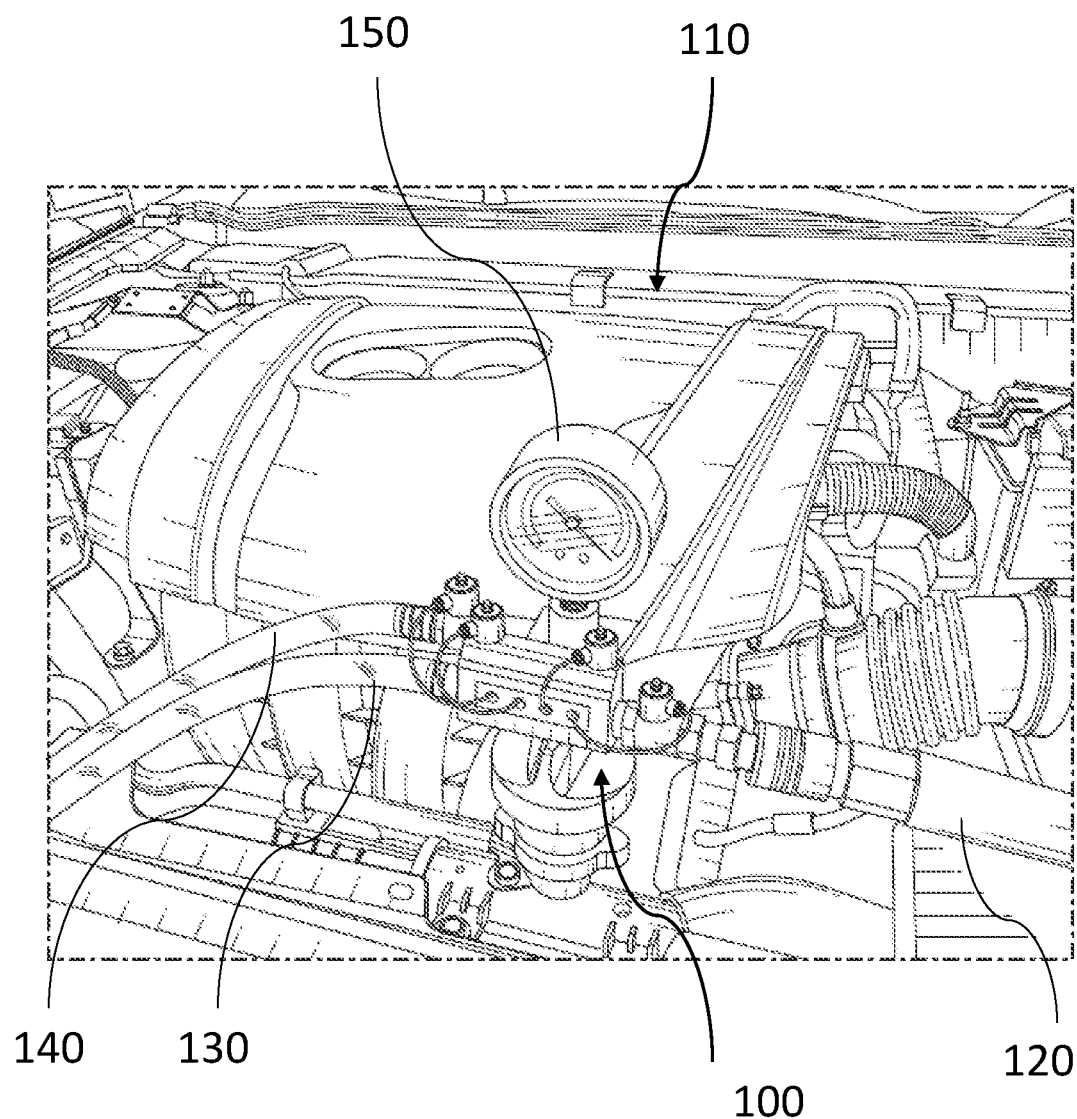
FIG. 1 is a perspective view of a pressure testing apparatus coupled to a vehicle coolant system according to an example embodiment of the disclosure.

FIG. 1 illustrates a perspective view of a pressure testing apparatus 100 according to an example embodiment. In the example embodiment, the pressure testing apparatus 100 is coupled to a vehicle coolant system 110. The pressure testing apparatus 100 is also coupled to a pressurized gas source 120, an external coolant source 130, a coolant exit 140, and a pressure transducer 150. In the illustrated embodiment, a user could connect the pressure testing apparatus 100 to the vehicle coolant system 110, the pressurized gas source 120, the external coolant source 130, and the coolant exit 140 without having to disconnect any of the connections. The user can then test the pressure of the coolant system of the vehicle coolant system 110 and refill the vehicle coolant system 110 without disconnect any of the connections.

Figure 2A:
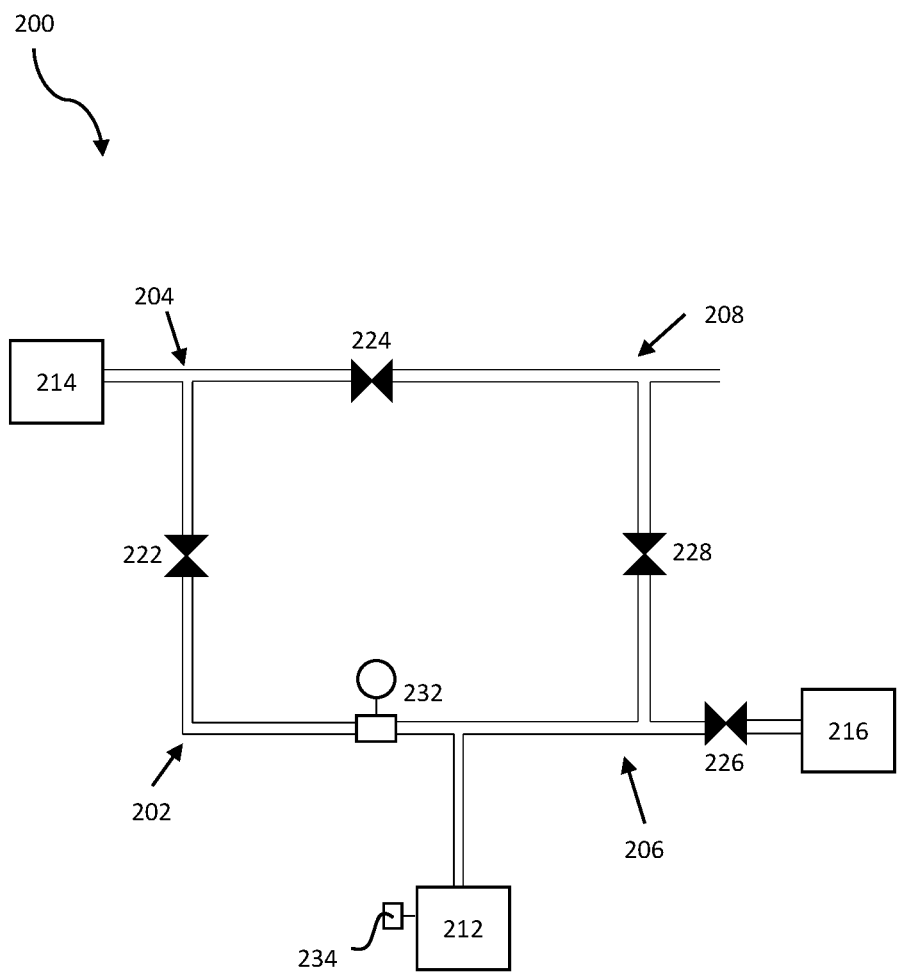
FIG. 2A is a schematic depiction of a pressure testing system in a first configuration according to an embodiment of the disclosure.

FIG. 2A illustrates a pressure testing apparatus 200 in a first configuration according to an example embodiment. In some embodiments, the pressure testing apparatus 200 may be used in an environment similar to the one illustrated in FIG. 1. The pressure testing apparatus 200 includes an inlet passage 202 coupled to a coolant system 212, a pressurized gas passage 204 coupled to a pressurized gas source 214, a coolant source passage 206 coupled to an external coolant source 216, and an exit passage 208. The pressure testing apparatus 200 further includes: (i) a pressurized gas inlet valve 222 disposed between the pressurized gas passage 204 and the inlet passage 202; (ii) a pressurized gas exit valve 224 disposed between the pressurized gas passage 204 and the exit passage 208; (iii) a coolant source valve 226 disposed between the external coolant source 216 and the coolant source passage 206; and (iv) a coolant system pressure exit valve 228 disposed between the exit passage 208 and the coolant source passage 206. In FIG. 2A, the pressurized gas inlet valve 222, the pressurized gas exit valve 224, the coolant source valve 226, and the coolant system pressure exit valve 228 are each in a closed state, indicated by shading in FIG. 2A. The pressure testing apparatus 200 also includes a pressure transducer 232 disposed between the pressurized gas valve 222, the coolant source valve 226, and the coolant system pressure exit valve 228. The coolant system 212 includes a level sensor 234.

Figure 2B:
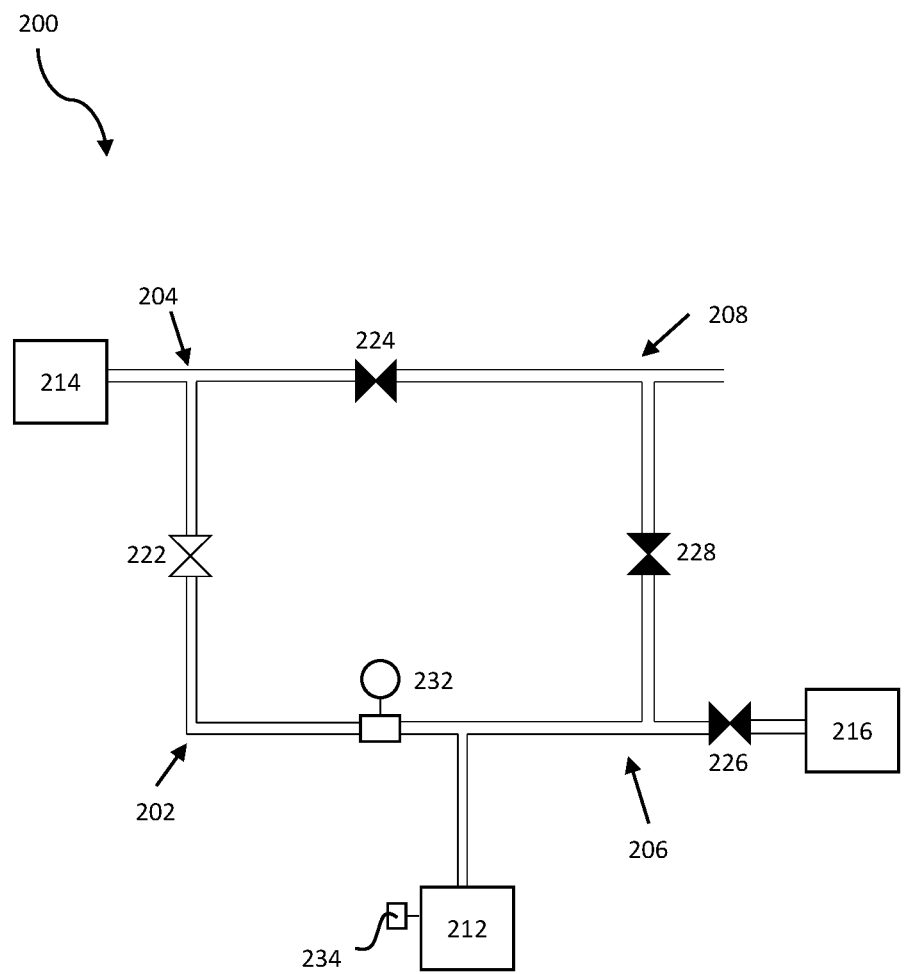
FIG. 2B is a schematic depiction of the pressure testing system of FIG. 2A in a system pressurizing configuration according to an embodiment of the disclosure.

FIG. 2B illustrates the pressure testing apparatus 200 in a system pressurizing configuration. The pressure testing apparatus 200 pressurizes the system by opening the pressurized gas valve 222, indicated by solid white fill, while simultaneously holding the pressurized exit valve 224, the coolant source valve 226, and the coolant system pressure exit valve 228 closed. When the pressurized gas inlet valve 222 is open, pressurized gas enters the pressure testing apparatus 200 and fills the pressurized gas passage 204 and the coolant system passage 202. The pressure testing apparatus 200 holds the pressurized gas valve 222 open until the pressure transducer 232 in the coolant system 212 indicates that the coolant system 212 is pressurized to a first specified pressure level.

Figure 2C:
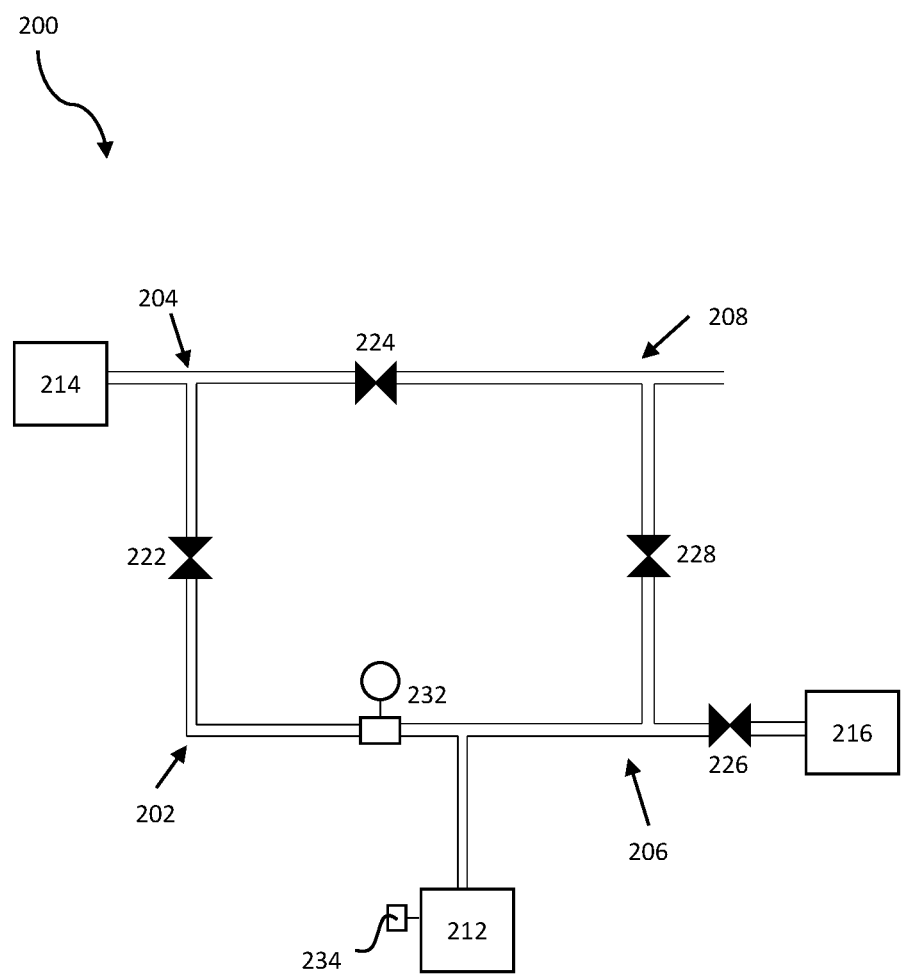
FIG. 2C is a schematic depiction of the pressure testing system of FIG. 2A in a system pressure holding configuration according to an embodiment of the disclosure.

FIG. 2C illustrates the pressure testing apparatus 200 in a pressure holding configuration. The pressure testing apparatus 200 closes the pressurized gas inlet valve 222 while keeping the other valves closed in order to maintain the pressure of the coolant system. While the valves 222, 224, 226, 228 are closed, the pressure transducer 232 measures the pressure of the coolant system. If the pressure does not drop to a predetermined level in a predetermined amount of time, the pressurized gas exit valve 224 and the coolant system pressure exit valve 228 are opened, as shown in FIG. 2D.

Figure 2D:
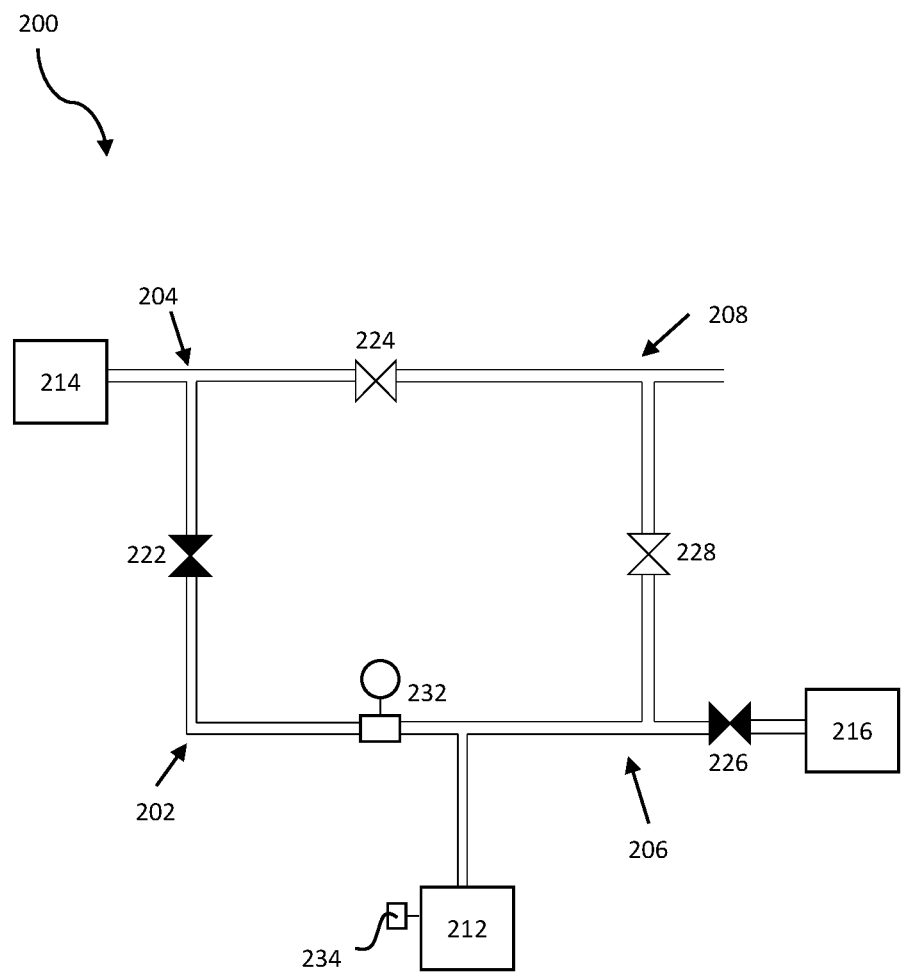
FIG. 2D is a schematic depiction of the pressure testing system of FIG. 2A in a coolant system pressure drop configuration according to an embodiment of the disclosure.

FIG. 2D illustrates the pressure testing apparatus 200 in a configuration that creates a pressure drop in the cooling system from the apparatus 200. When the pressurized gas exit valve 224 is open, pressurized gas flows through the exit passage 208. When the coolant system pressure exit valve 228 is open while the pressurized gas exit valve 224 is open, the pressurized gas flowing through the exit passage 208 creates a vacuum within the pressure testing apparatus 200 and the cooling system, pulling air through the exit passage 208. In some embodiments, the exit passage 208 has a constriction, causing a Venturi effect in the passage.

Figure 2E:
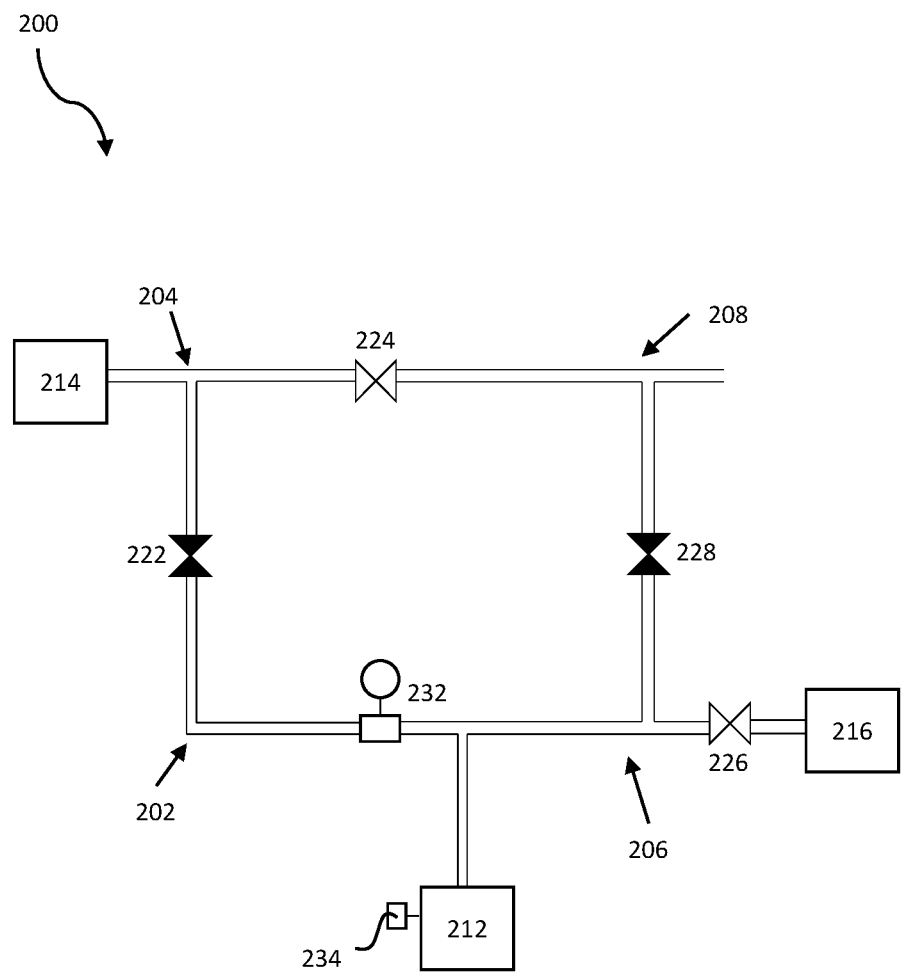
FIG. 2E is a schematic depiction of the pressure testing system of FIG. 2A in a coolant refilling configuration according to an embodiment of the disclosure.

FIG. 2E illustrates the pressure testing apparatus in a coolant refilling configuration. While the air is exiting the coolant system 212, the pressure transducer 232 monitors the pressure within the pressure testing apparatus 200. Once the pressure reaches a second predetermined level, the coolant exit valve 228 closes and the coolant source valve 226 opens, as illustrated in FIG. 2E, drawing coolant from the external coolant source 216 into the coolant system 212 due to the pressure differential between the coolant system 212 and the coolant source 216. While the coolant system 212 is being filled, the pressure transducer 232 monitors the pressure within the pressure testing apparatus 200.

Figure 2F:
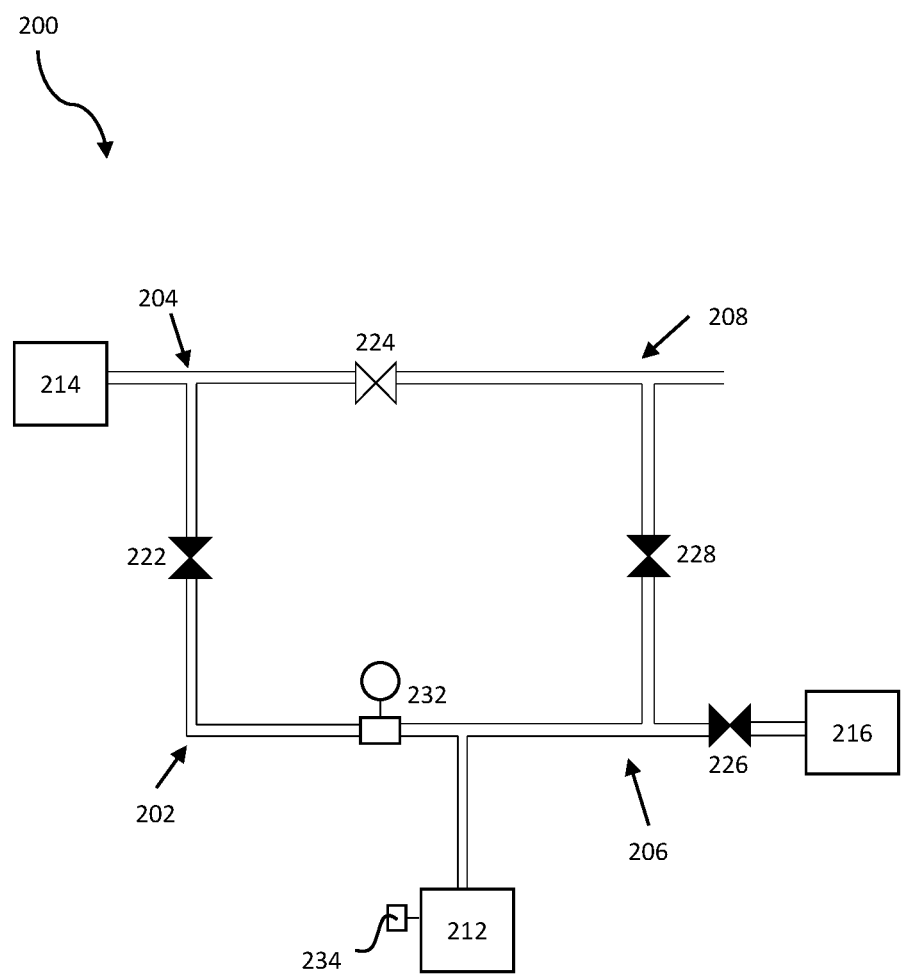
FIG. 2F is a schematic depiction of the pressure testing system of FIG. 2A in a pressurized coolant holding configuration according to an embodiment of the disclosure.

FIG. 2F illustrates the pressure testing apparatus in a pressure holding configuration. Once the pressure rises by a third predetermined amount, the level sensor 234 detects the fluid level in the coolant system 212. Once the fluid level is at a predetermined level, the pressure testing apparatus 200 conducts another pressure test, closing the coolant source valve 226, while holding the pressurized gas inlet valve 222 and the coolant system pressure exit valve 228 closed as well, as illustrated in FIG. 2F.

If the pressure transducer 232 detects a drop in pressure during a second predetermined time, the apparatus 200 will determine that there is a leak in the coolant system 212. If the pressure transducer 232 does not detect a drop in pressure during the second predetermined time, the apparatus 200 will determine that there is not a leak in the coolant system 212 and that the coolant system 212 has been refilled with coolant, the coolant system pressure exit valve 228 is then opened to allow the coolant system to equalize with atmospheric pressure. At this time, the pressure testing apparatus 200 can be disconnected from the coolant system 212.

Figure 3:
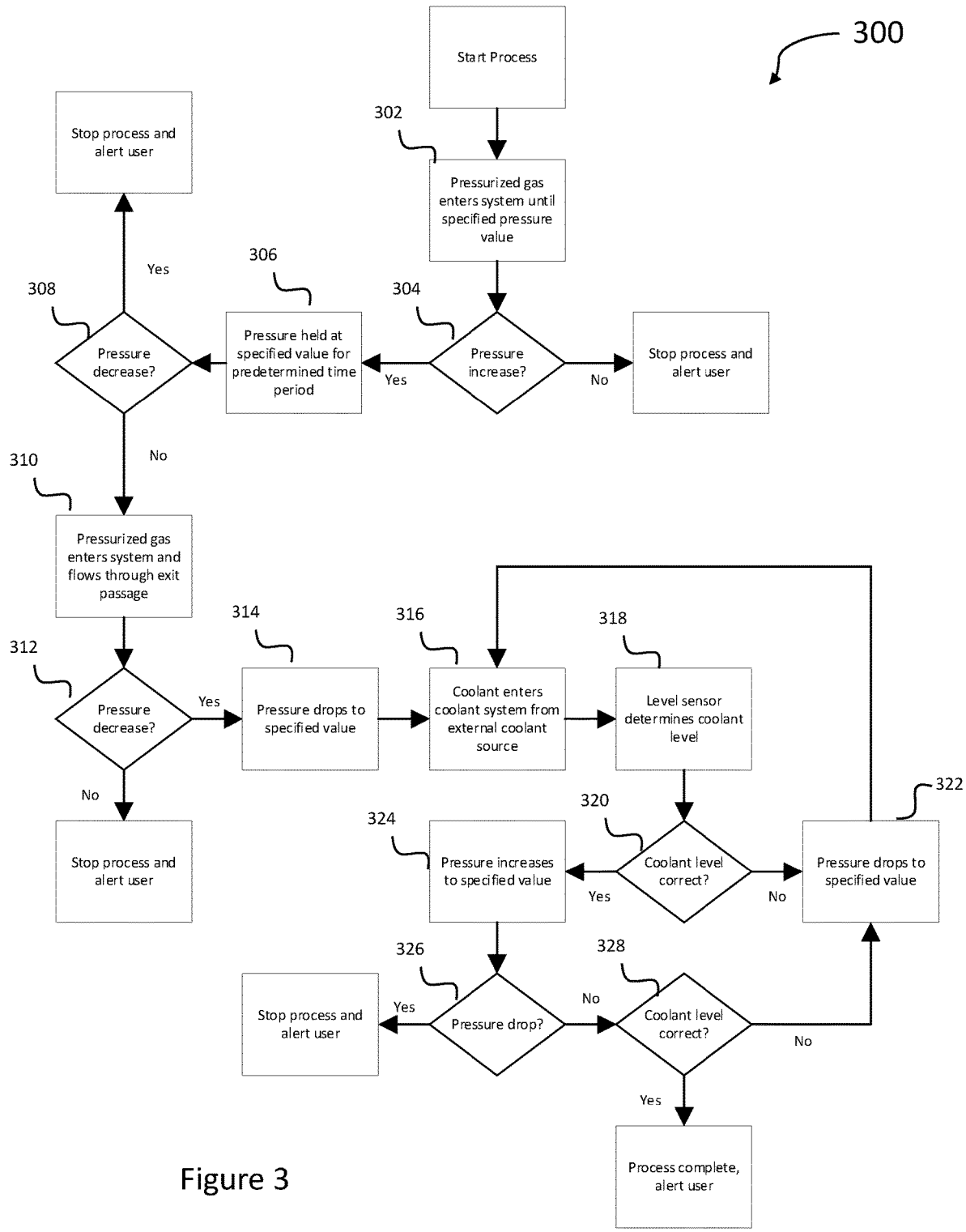
FIG. 3 is a flow chart illustrating a method according to an example embodiment of the disclosure.

FIG. 3 illustrates a method 300 of pressure testing and refilling a cooling system according to an example embodiment. As shown in element 302, in the method 300 pressurized gas enters a coolant system until a specified pressure value is reached. As shown in element 304, the method 300 assesses whether the pressure in the system increases. If the pressure does not increase to the specified level, the enabling criteria is not met and the process is stopped, alerting the user that there is a leak in the system.

If the enabling criteria is met, the method 300 continues to element 306. As shown in element 306 in the method 300, the pressure of the system is held at the specified value for a predetermined amount of time. The method 300 then assesses, as shown in element 308, whether the pressure of the system decreases. If the pressure does decrease, the process is stopped, alerting the user that there is a leak in the system. If the pressure does not decrease, the process continues to element 310. In some embodiments, the method may include recording or indicating to user that the process is proceeding properly.

As shown in element 310 in the method 300, pressurized gas then enters the system and flows through the exit passage. The method 300 assesses whether the pressure in the system decreases while the pressurized gas flows through the exit passage, as shown in element 312. If the pressure does not decrease, the process is stopped, alerting the user of a leak in the system.

If the pressure does decrease to a specified value, as illustrated in element 314, coolant then enters the coolant system from an external coolant source, as illustrated in element 316. In some embodiments, the method may include recording or indicating to a user that the pressure did decrease to the specified value and that coolant is entering the system.

As illustrated by elements 316 to 322, the method 300 assesses the level of coolant in the system. If the level of coolant is not correct, the method 300 will drop the pressure of the coolant in the system, shown in element 322, and repeat elements 316 through 320 until the coolant level is correct. In some embodiments, the method 300 may use another type of sensor, such as a proximity sensor, or a floating sensor. In further embodiments, the method 300 may use another metric to evaluate whether a predetermined amount of coolant has entered the coolant system, such as flow rate, pressure, temperature, or any other suitable metric. In some embodiments, the method may include recording or indicating to a user that the selected metric does indicate that the predetermined amount of coolant has entered the coolant system. In further embodiments the number of cycles of the repeat elements 316 through 320 can be selected by the user.

Once the coolant level is correct, the pressure in the system will increase to a specified value, as illustrated in element 324. The method 300 will then assess whether the pressure in the system drops, shown in element 326. If the pressure does drop, the method 300 stops, alerting the user to a leak in the system. If the pressure does not drop, the method 300 will then assess again whether the coolant level of the system is correct, shown in element 328. If the coolant level is not correct, the method 300 repeats elements 316 to 328 until the coolant level is correct and the pressure does not drop. If the pressure does not drop and the coolant level of the system is correct, the method 300 is completed, alerting the user that the system has been refilled and that there is not a leak in the system.

In some embodiments, if the pressure does not increase at element 304, it may be an indication that an operating valve has failed to open such that pressurized gas does not enter the system. In some embodiments, if the pressure does not decrease at element 312, it may be an indication that an operating valve has failed such that the pressurized gas is not flowing through the system or out of the exit passage. In some embodiments, if the coolant level is not correct at element 320, it may be an indication that an operating valve has failed such that coolant is not flowing into the system from the external coolant source.

In further embodiments, the method may include running a set of operations to isolate which operating valve is failing to open or close. Further still, the method may include a series of operations to determine: (i) whether a leak is present in the system; and (ii) which passage of the system has the leak. In such embodiments, the method further includes alerting a user: (i) that a leak is present in the system; and (ii) which passage contains the leak.

Figure 4:
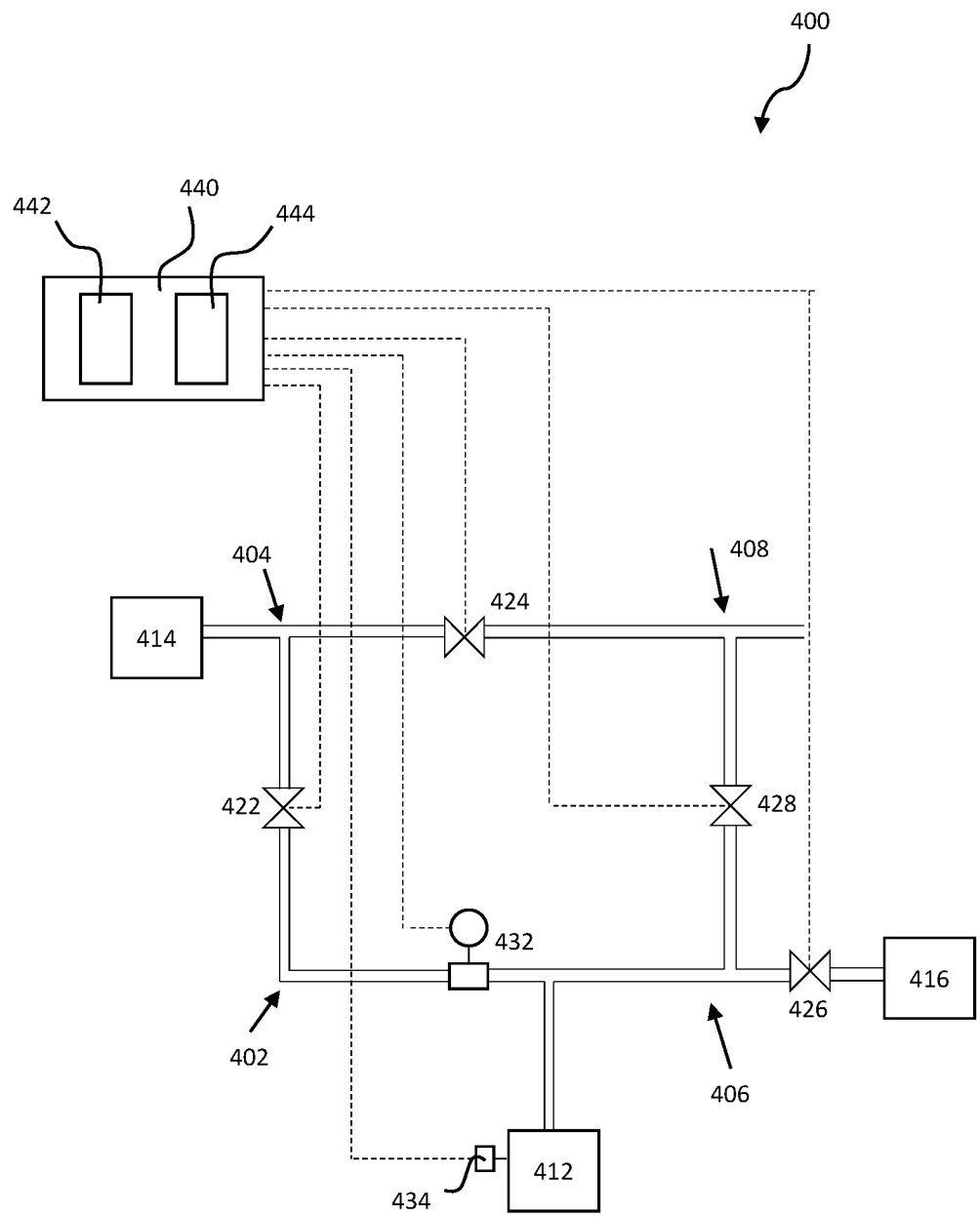
FIG. 4 is a schematic depiction of a system according to an embodiment of the disclosure.

FIG. 4 illustrates a pressure testing system 400 according to an example embodiment. The system 400 includes an inlet passage 402 coupled to a coolant system 412, a pressurized gas passage 404 coupled to a pressurized gas source 414, a coolant source passage 406 coupled to an external coolant source 416, and an exit passage 408. The system 400 further includes: (i) a pressurized gas inlet valve 422 disposed between the pressurized gas passage 404 and the inlet passage 402; (ii) a pressurized gas exit valve 424 disposed between the pressurized gas passage 404 and the exit passage 408; (iii) a coolant source valve 426 disposed between the external coolant source 416 and the coolant source passage 406; and (iv) a coolant system pressure exit valve 428 disposed between the exit passage 408 and the coolant source passage 406. The system 400 also includes a pressure transducer 432 disposed between the pressurized gas valve 422, the coolant source valve 426, and the exit valve 428. The coolant system 412 includes a level sensor 434.

The system 400 further includes a controller 440. The controller 440 includes one or more processors 442 and a computer-readable medium (CRM) 444. The processor 442 can include a general processor or a special purpose processor (e.g., a digital signal processor, a graphics processor, or an application specific integrated circuit (ASIC) processor). Any processor 442 may be configured to execute computer-readable program instructions, hard-coded functionality, and/or software-coded functionality. The processor 442 may be programmed to perform any function or combination of functions described herein as being performed by the controller 440.

The CRM 444 may include a non-transitory computer-readable medium. The CRM 444 may be integrated in whole or in part with any processor 442 or may be entirely separate from any processor 442. The CRM 444 may further include a random-access memory, a read-only memory, or any other suitable memory device that is configured to provide data to any processor 442. In some embodiments, the CRM 444 may include a non-transitory computer readable medium or memory, such as Random Access Memory (RAM).

The controller 440 is configured to receive signals from various sensors, including pressure sensor 432 and level sensor 434. The controller 440 is also configured to send operating signals to, at least: (i) the pressurized gas inlet valve 422; (ii) the pressurized gas exit valve 424; (iii) the coolant source valve 426; and (iv) the coolant system pressure exit valve 428. In some embodiments, the signal lines from the controller 440 may be physical signal lines, while in other embodiments, the controller 440 may send signals via wireless communication, such as over Wi-Fi or Bluetooth® connections.

The CRM 444 of the controller 440 may be configured to store instructions to cause the controller 440 to perform operations that are part of a method for refilling and pressure testing a coolant system, such as method 300.

In some embodiments, the controller 440 is coupled to a user interface system, the user interface system configured to receive an input from a user to control the plurality of operating valves. In further embodiments, the user interface system may be accessed via a mobile application.

In some embodiments, the level sensor is further configured to read a coolant level in the coolant system until receiving an indication that the coolant level in the coolant system is the predetermined coolant level. In such embodiments, the level sensor may output a signal indicating the level of coolant in the system in real-time.

In some embodiments, the pressurized gas source stores compressed air. In other embodiments, the pressurized gas source may store any suitable compressed gas.

In some embodiments, the operating valves are electronically controlled mechanical valves, such as solenoid valves.

In some embodiments, the pressure testing apparatus also includes a passage disposed between the exit passage and the external coolant source, such that coolant that leaves the pressure testing apparatus and is recycled to the external coolant source. In further embodiments, the pressure testing apparatus may include a coolant recycling operating valve disposed between the exit passage and the external coolant source, the coolant recycling operating valve configured to open and close based on various configurations of the pressure testing apparatus.

In some embodiments, the exit passage is coupled to the external coolant source.

In some embodiments, the pressure testing apparatus is connected to a vehicle coolant system. In other embodiments, the coolant system may be connected to any device that needs to be cooled, such as a high voltage battery or electric motor. In further embodiments, the system may contain any suitable fluid.

In some embodiments, the user interface is configured to receive an input from a user to send command signals to the operating valves of the pressure testing system.

It should be understood that the arrangements described herein and/or shown in the drawings are for purposes of example only and are not intended to be limiting. As such, those skilled in the art will appreciate that other arrangements and elements can be used instead, and some elements can be omitted altogether.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein is for the purpose of describing embodiments only, and is not intended to be limiting.

In this description, the articles "a," "an," and "the" are used to introduce elements and/or functions of the example embodiments. The intent is using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each embodiment including a listed component or function independently and each embodiment including a combination of the listed components or functions. For example, an embodiment described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible embodiments: (i) an embodiment including A, but not B and not C, (ii) an embodiment including B, but not A and not C, (iii) an embodiment including C, but not A and not B, (iv) an embodiment including A and B, but not C, (v) an embodiment including A and C, but not B, (v) an embodiment including B and C, but not A, and/or (vi) an embodiment including A, B, and C. For the embodiments including component or function A, the embodiments can include one A or multiple A. For the embodiments including component or function B, the embodiments can include one B or multiple B. For the embodiments including component or function C, the embodiments can include one C or multiple C. In accordance with the aforementioned example and at least some of the example embodiments, "A" can represent a component, "B" can represent a system, and "C" can represent a device.

The use of ordinal numbers such as "first," "second," "third" and so on is to distinguish respective elements rather than to denote an order of those elements unless the context of using those terms explicitly indicates otherwise. Further, the description of a "first" element, such as a first operating valve, does not necessitate the presence of a second or any other element, such as a second operating valve.

The invention claimed is:

1. A pressure testing apparatus comprising:
a plurality of passages, wherein the plurality of passages comprise:
an inlet passage coupled to a coolant system;
a pressurized gas passage coupled to a pressurized gas source;
a coolant source passage coupled to an external coolant container; and
an exit passage; and
a plurality of operating valves, each operating valve being disposed in a respective passage of the plurality of passages;
a pressure sensor disposed in a downstream section of the pressurized gas passage, the downstream section being disposed between at least two operating valves of the plurality of operating valves and the coolant system; and
a controller configured to perform operations comprising:
sending a first shut-off control signal to each operating valve of the plurality of operating valves, wherein each first shut-off control signal closes the respective operating valve;
sending a first turn-on control signal to the operating valve disposed in the pressurized gas passage, wherein the first turn-on control signal triggers the opening of the operating valve disposed in the pressurized gas passage;

in response to receiving an indication that a first measured pressure in the downstream section of the pressurized gas passage is a first predetermined pressure value, sending a second shut-off control signal to the operating valve disposed in the pressurized gas passage thereby triggering the closing of the operating valve disposed in the pressurized gas passage;

in response to receiving an indication that a second measured pressure does not decrease to a second predetermined pressure value in a first predetermined duration of time after sending the second shut-off control signal to the operating valve disposed in the pressurized gas passage, sending second turn-on control signals to:
  the operating valve disposed between the pressurized gas source and the exit passage; and
  the operating valve disposed between the coolant source passage and the exit passage, the second turn-on control signals opening the respective operating valves thereby creating a second measured pressure value in the pressure testing system;

in response to receiving an indication that the second measured pressure decreases to a third predetermined pressure value:
  sending a third shut-off control signal to the operating valve disposed between the coolant system and the exit passage, the third shut-off control signal closing the operating valve disposed between the coolant system and the exit passage; and
  sending a third turn-on control signal to the operating valve disposed between the external coolant container and the coolant system, the third turn-on control signal opening the operating valve;

in response to receiving an indication that a fourth measured pressure is a fourth predetermined pressure value, receiving a signal from a level sensor, the level sensor configured to measure a first level of coolant in the coolant system;

in response to receiving an indication that the first level of coolant in the coolant system is a predetermined coolant level, sending a fourth shut-off signal to the operating valve disposed between the external coolant container and the coolant system, the fourth shut-off signal closing the operating valve; and in response to receiving an indication that a fifth measured pressure does not decrease to a fifth predetermined pressure value in a second predetermined duration of time, sending an indication that the coolant system has been refilled and is free of a substantial leak.

2. The pressure testing apparatus of claim 1, wherein the controller is further configured to, in response to receiving an indication that the first measured pressure does not increase to the first predetermined pressure value, send an indication of a leak in the coolant system or the pressure testing system.

3. The pressure testing apparatus of claim 1, wherein the controller is further configured to, in response to receiving an indication that the second measured pressure decreases to the second predetermined pressure value in the first predetermined duration of time, send an indication of a leak in the coolant system or the pressure testing system.

4. The pressure testing apparatus of claim 1, wherein the controller is further configured to, in response to receiving an indication that the fifth measured pressure decreases to the fifth predetermined pressure value in the second predetermined duration of time, send an indication of a leak in the coolant system or the pressure testing system.

5. The pressure testing apparatus of claim 1, wherein the controller is further configured to perform operations comprising:
  in response to receiving an indication that the first level of coolant in the coolant system is lower than the predetermined coolant level, sending a fourth turn-on signal to the operating valve disposed in the pressurized gas passage, the fourth turn-on signal opening the operating valve, sending a fifth turn-on signal to the operating valve disposed between the coolant system and the exit passage, the fifth turn-on signal opening the operating valve; and sending a fifth shut-off signal to the operating valve disposed between the external coolant container and the coolant system, the fifth shut-off signal closing the operating valve;
  in response to receiving an indication that a sixth measured pressure decreases to the third predetermined pressure value, sending a sixth shut-off control signal to the operating valve disposed between the coolant system and the exit passage, the sixth shut-off control signal closing the operating valve disposed between the coolant system and the exit passage, and sending a sixth turn-on control signal to the operating valve disposed between the external coolant container and the coolant system, the sixth turn-on control signal opening the operating valve;
  in response to receiving an indication that a seventh measured pressure is the fourth predetermined pressure value, receiving a signal from a level sensor, the level sensor configured to measure a second level of coolant in the coolant system;
  in response to receiving an indication that the second level of coolant in the coolant system is the predetermined coolant level, sending a seventh shut-off signal to the operating valve disposed between the external coolant container and the coolant system, the seventh shut-off signal closing the operating valve; and
  in response to receiving an indication that an eighth measured pressure does not decrease to the fifth predetermined pressure value in the second predetermined duration of time, sending an indication that the coolant system has been refilled and is free of a substantial leak.

6. The pressure testing apparatus of claim 5, wherein the controller is further configured to perform the operations of claim 5 until receiving an indication that a measured level of coolant in the coolant system is the predetermined coolant level.

7. The pressure testing apparatus of claim 1, wherein the controller is coupled to a user interface system, the user interface system configured to receive an input from a user to control the plurality of operating valves.

8. The pressure testing apparatus of claim 1, wherein the level sensor is further configured to read a coolant level in the coolant system until receiving an indication that the coolant level in the coolant system is the predetermined coolant level.

9. The pressure testing apparatus of claim 1, wherein the pressurized gas source stores compressed air.

10. The pressure testing apparatus of claim 1, wherein the plurality of operating valves are electronically controlled mechanical valves.

11. The pressure testing apparatus of claim 1, wherein the plurality of passages further comprises a passage disposed between the exit passage and an external coolant source.

12. A pressure testing system, the system comprising:
a coolant system;
a pressurized gas source;
an external coolant container;
a pressure testing device, the device comprising:
an inlet passage coupled to the coolant system;
a coolant source passage coupled to the external coolant container;
a pressurized gas passage coupled to the pressurized gas source;
an exit passage;
a first operating valve disposed between the inlet passage and the exit passage;
a second operating valve disposed between the inlet passage and the pressurized gas passage;
a third operating valve disposed between the pressurized gas passage and the coolant source passage;
a fourth operating valve disposed between the pressurized gas passage and the exit passage;
a pressure transducer disposed in a downstream section of the pressurized gas passage, the downstream section being disposed between at least the second operating valve and the fourth operating valve; and
a controller configured to perform operations comprising:
sending a first shut-off control signal to each of the operating valves, wherein each first shut-off control signal closes the respective operating valve;
sending a first turn-on control signal to the operating valve disposed in the pressurized gas passage, wherein the first turn-on control signal triggers the opening of the operating valve disposed in the pressurized gas passage;
in response to receiving an indication that a first measured pressure in the downstream section of the pressurized gas passage is a first predetermined pressure value sending a second shut-off control signal to the operating valve disposed in the pressurized gas passage thereby triggering the closing of the operating valve disposed in the pressurized gas passage;
in response to receiving an indication that a second measured pressure does not decrease to a second predetermined pressure value in a first predetermined duration of time after sending the second shut-off control signal to the operating valve disposed in the pressurized gas passage, sending second turn-on control signals to:
the operating valve disposed between the pressurized gas source and the exit passage; and
the operating valve disposed between the coolant source passage and the exit passage, the second turn-on control signals opening the respective operating valves thereby creating a second measured pressure value in the pressure testing system;
in response to receiving an indication that the second measured pressure decreases to a third predetermined pressure value:
sending a third shut-off control signal to the operating valve disposed between the coolant system and the exit passage, the third shut-off control signal closing the operating valve disposed between the coolant system and the exit passage; and
sending a third turn-on control signal to the operating valve disposed between the external coolant container and the coolant system, the third turn-on control signal opening the operating valve;
in response to receiving an indication that a fourth measured pressure is a fourth predetermined pressure value, receiving a signal from a level sensor, the level sensor configured to measure a first level of coolant in the coolant system;
in response to receiving an indication that the first level of coolant in the coolant system is a predetermined coolant level, sending a fourth shut-off signal to the operating valve disposed between the external coolant container and the coolant system, the fourth shut-off signal closing the operating valve; and
in response to receiving an indication that a fifth measured pressure does not decrease to a fifth predetermined pressure value in a second predetermined duration of time, sending an indication that the coolant system has been refilled and is free of a substantial leak.

13. The pressure testing system of claim 12, wherein the pressure testing device is connected to a vehicle coolant system.

14. The pressure testing system of claim 12, wherein the exit passage is coupled to an external coolant source.

15. The pressure testing system of claim 12, further comprising a user interface system coupled to the controller, wherein the user interface system is configured to receive an input from a user to send command signals to the operating valves of the pressure testing system.

16. A method for pressure testing a coolant system, wherein a pressure testing system includes a plurality of passages comprising an inlet passage coupled to the coolant system, a pressurized gas passage coupled to a pressurized gas source, a coolant source passage coupled to an external coolant container, and an exit passage, and a plurality of operating valves, each operating valve being disposed in a respective passage of the plurality of passages, the method comprising:
sending a first shut-off control signal to each operating valve of the plurality of operating valves, wherein each first shut-off control signal closes the respective operating valve;
sending a first turn-on control signal to the operating valve disposed in the pressurized gas passage, wherein the first turn-on control signal triggers the opening of the operating valve disposed in the pressurized gas passage;
in response to receiving, by a pressure transducer, an indication that a first measured pressure in a downstream section of the pressurized gas passage is a first predetermined pressure value, sending a second shut-off control signal to the operating valve disposed in the pressurized gas passage thereby triggering the closing of the operating valve disposed in the pressurized gas passage;
in response to receiving an indication that a second measured pressure does not decrease to a second predetermined pressure value in a first predetermined duration of time after sending the second shut-off control signal to the operating valve disposed in the pressurized gas passage, sending second turn-on control signals to:

the operating valve disposed between the pressurized gas source and the exit passage; and the operating valve disposed between the coolant source passage and the exit passage, the second turn-on control signals opening the respective operating valves thereby creating a second measured pressure value in the pressure testing system;

in response to receiving an indication that the second measured pressure decreases to a third predetermined pressure value:

sending a third shut-off control signal to the operating valve disposed between the coolant system and the exit passage, the third shut-off control signal closing the operating valve disposed between the coolant system and the exit passage; and sending a third turn-on control signal to the operating valve disposed between the external coolant container and the coolant system, the third turn-on control signal opening the operating valve;

in response to receiving an indication that a fourth measured pressure is a fourth predetermined pressure value, receiving a signal from a level sensor, the level sensor configured to measure a first level of coolant in the coolant system;

in response to receiving an indication that the first level of coolant in the coolant system is a predetermined coolant level, sending a fourth shut-off signal to the operating valve disposed between the external coolant container and the coolant system, the fourth shut-off signal closing the operating valve; and in response to receiving an indication that a fifth measured pressure does not decrease to a fifth predetermined pressure value in a second predetermined duration of time, sending an indication that the coolant system has been refilled and is free of a substantial leak.

17. The method of claim 16, further comprising, in response to receiving an indication that the first measured pressure does not increase to the first predetermined pressure value, sending an indication of a leak in the coolant system or the pressure testing system.

18. The method of claim 16, further comprising, in response to receiving an indication that the second measured pressure decreases to the second predetermined pressure value in the first predetermined duration of time, sending an indication of a leak in the coolant system or pressure testing system.

19. The method of claim 16 further comprising, in response to receiving an indication that the fifth measured pressure decreases to the fifth predetermined pressure value in the second predetermined duration of time, sending an indication of a leak in the coolant system or pressure testing system.

20. The method of claim 16 further comprising:

in response to receiving an indication that the first level of coolant in the coolant system is lower than the predetermined coolant level:

sending a fourth turn-on signal to the operating valve disposed in the pressurized gas passage, the fourth turn-on signal opening the operating valve;

sending a fifth turn-on signal to the operating valve disposed between the coolant system and the exit passage, the fifth turn-on signal opening the operating valve; and sending a fifth shut-off signal to the operating valve disposed between the external coolant container and the coolant system, the fifth shut-off signal closing the operating valve;

in response to receiving an indication that a sixth measured pressure decreases to the third predetermined pressure value:

sending a sixth shut-off control signal to the operating valve disposed between the coolant system and the exit passage, the sixth shut-off control signal closing the operating valve disposed between the coolant system and the exit passage; and sending a sixth turn-on control signal to the operating valve disposed between the external coolant container and the coolant system, the sixth turn-on control signal opening the operating valve;

in response to receiving an indication that a seventh measured pressure is the fourth predetermined pressure value, receiving a signal from a level sensor, the level sensor configured to measure a second level of coolant in the coolant system;

in response to receiving an indication that the second level of coolant in the coolant system is the predetermined coolant level, sending a seventh shut-off signal to the operating valve disposed between the external coolant container and the coolant system, the seventh shut-off signal closing the operating valve; and in response to receiving an indication that an eighth measured pressure does not decrease to the fifth predetermined pressure value in the second predetermined duration of time, sending an indication that the coolant system has been refilled and is free of a substantial leak.

* * * * *